(12) United States Patent
Bruck

(10) Patent No.: US 9,114,740 B2
(45) Date of Patent: Aug. 25, 2015

(54) TRUNK LOCATED SECOND ROW SEATBACK DUMP LATCH ASSEMBLY

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 221 days.

(21) Appl. No.: 13/359,637

(22) Filed: Jan. 27, 2012

(65) Prior Publication Data

US 2012/0261929 A1    Oct. 18, 2012

Related U.S. Application Data

(60) Provisional application No. 61/436,706, filed on Jan. 27, 2011.

(51) Int. Cl.
| | |
|---|---|
| *E05C 3/16* | (2006.01) |
| *B60N 2/36* | (2006.01) |
| *E05C 3/02* | (2006.01) |
| *E05C 3/06* | (2006.01) |
| *E05C 3/04* | (2006.01) |

(52) U.S. Cl.
CPC ............. *B60N 2/366* (2013.01); *B60N 2205/40* (2013.01); *Y10T 292/108* (2015.04); *Y10T 292/1059* (2015.04)

(58) Field of Classification Search
CPC ....................... Y10T 292/1059; Y10T 292/108
USPC .......... 292/226, DIG. 37, 201, 210, 216, 194, 292/195, 220, 222, 224, 197, 198, 200, 163, 292/164, DIG. 42, DIG. 14; 297/378.13
See application file for complete search history.

(56) References Cited

U.S. PATENT DOCUMENTS

| | | | | |
|---|---|---|---|---|
| 3,294,443 | A | * | 12/1966 | Beckman et al. .............. 297/369 |
| 3,743,335 | A | * | 7/1973 | Reilhac et al. ................ 292/127 |
| 3,794,380 | A | * | 2/1974 | Mertz ....................... 297/378.12 |
| 4,636,005 | A | * | 1/1987 | Bolz et al. ................ 297/378.13 |
| 4,667,492 | A | | 5/1987 | Tomatsu et al. |
| 4,684,175 | A | * | 8/1987 | Trutter ..................... 297/378.13 |
| 4,779,927 | A | * | 10/1988 | Trutter et al. ............ 297/378.13 |
| 4,881,767 | A | * | 11/1989 | Kondo .......................... 292/224 |
| 4,904,003 | A | | 2/1990 | Yamazaki et al. |
| 4,904,033 | A | * | 2/1990 | Ikeda et al. ..................... 359/12 |
| 4,991,884 | A | * | 2/1991 | Cairns ............................ 292/28 |
| 5,662,369 | A | * | 9/1997 | Tsuge .............................. 296/66 |
| 5,664,839 | A | * | 9/1997 | Pedronno et al. ........ 297/378.13 |
| 5,700,056 | A | * | 12/1997 | Bernard ................... 297/378.13 |
| 5,762,401 | A | * | 6/1998 | Bernard ................... 297/378.13 |
| 5,855,414 | A | * | 1/1999 | Daniel et al. ............. 297/378.13 |

(Continued)

FOREIGN PATENT DOCUMENTS

JP           08091101 A        4/1996

*Primary Examiner* — Carlos Lugo
*Assistant Examiner* — Faria Ahmad
(74) *Attorney, Agent, or Firm* — Gifford, Krass, Sprinkle, Anderson & Citkowski, P.C.; Douglas J. McEvoy

(57) ABSTRACT

A latch triggering mechanism for actuating a rear interior row seatback dump including a first generally cylinder shaped module mounted within a trunk of a vehicle, the module including a downwardly extending and displaceable bracket. A latch assembly is secured to a package surface separating the trunk from a passenger interior of the vehicle. A release lever associated with the latch extends in abutting contact with the bracket such that, upon actuating the bracket into contact with the lever, the latch disengages a striker associated with a foldable seatback.

20 Claims, 12 Drawing Sheets

(56) References Cited

U.S. PATENT DOCUMENTS

| | | | |
|---|---|---|---|
| 5,879,043 A | 3/1999 | Radue et al. | |
| 6,026,705 A | 2/2000 | Ficyk et al. | |
| 6,139,076 A * | 10/2000 | Hara et al. | 292/336.3 |
| 6,786,551 B2 * | 9/2004 | Brewer et al. | 297/378.12 |
| 6,908,137 B2 | 6/2005 | Doxey et al. | |
| 7,338,128 B2 * | 3/2008 | Inoue et al. | 297/378.13 |
| 7,410,217 B2 * | 8/2008 | Inoue et al. | 297/378.13 |
| 7,416,254 B2 * | 8/2008 | Jennings | 297/378.12 |
| 7,575,280 B2 * | 8/2009 | Palomba et al. | 297/336 |
| 7,614,702 B2 | 11/2009 | Kubler et al. | |
| 7,780,207 B2 | 8/2010 | Gotou et al. | |
| 7,806,480 B2 | 10/2010 | Wieclawski | |
| 8,608,245 B2 * | 12/2013 | Wieclawski | 297/378.13 |

* cited by examiner

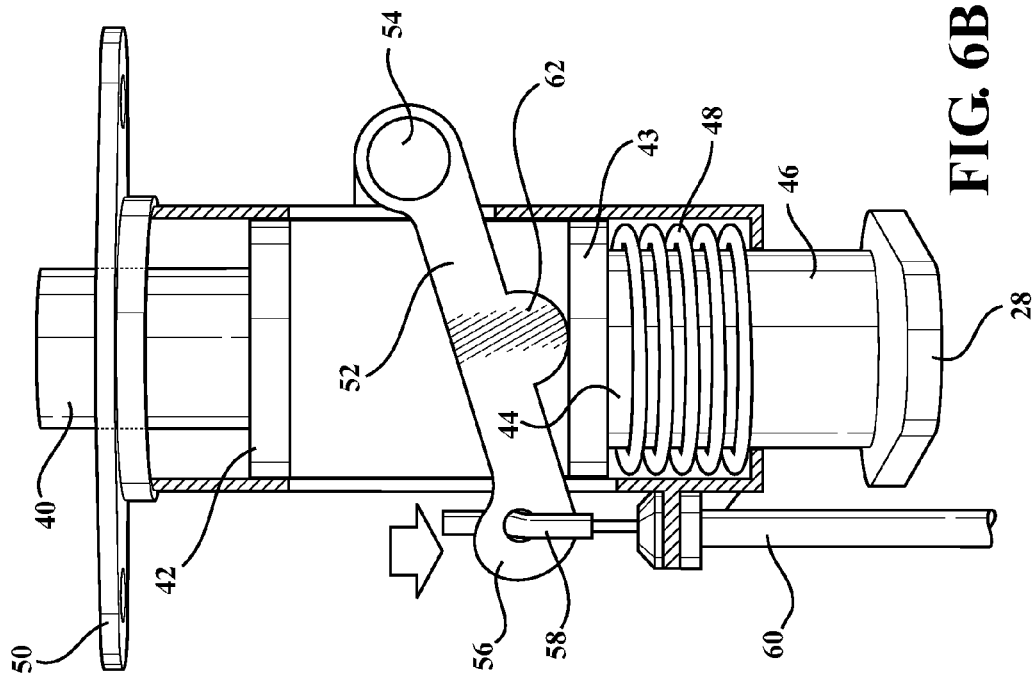
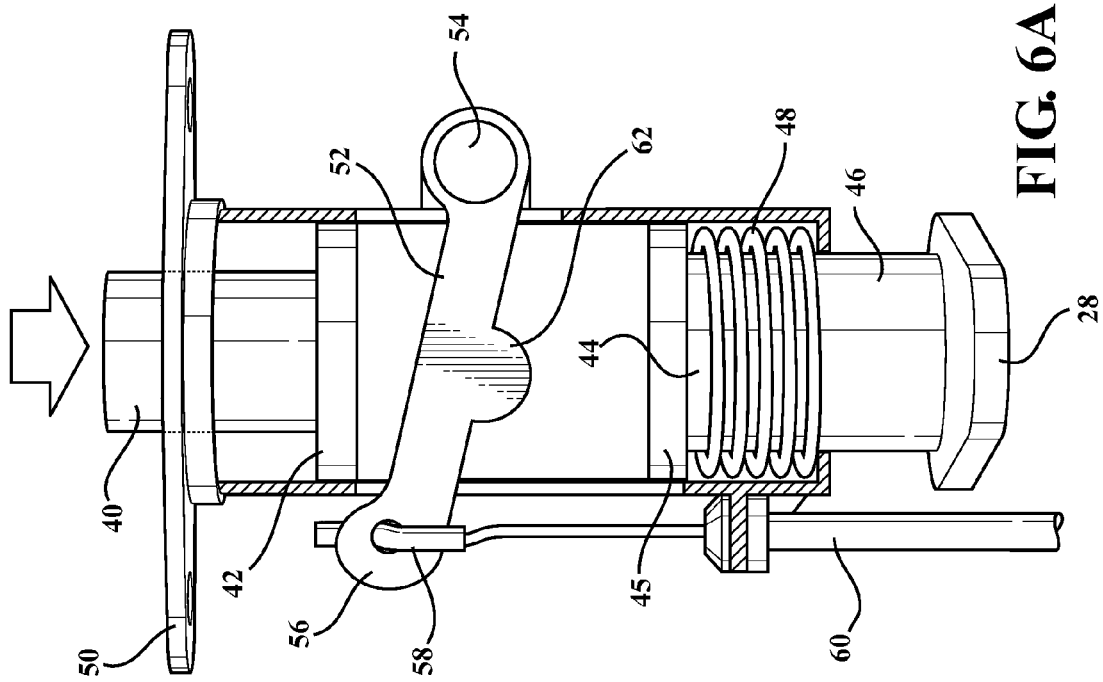

TRUNK LOCATED SECOND ROW SEATBACK DUMP LATCH ASSEMBLY

CROSS-REFERENCE TO RELATED APPLICATIONS

This Application claims the benefit of U.S. Provisional Application 61/436,706 filed on Jan. 27, 2011.

FIELD OF THE INVENTION

The present invention discloses a trunk latch triggering mechanism for actuating a rear interior row seatback dump. The mechanism includes a first cylinder module mounted within the trunk and which communications, via a cable, with a pull strap located at a seat side location within the vehicle. The latch is mounted to a rear package shelf location within the vehicle and includes a release lever which projects through a proximate aperture and into the trunk compartment. The latch is triggered in one instance by displacement of the cable pivotally mounted to a bottom spring biased and displacing bracket incorporated into the cylinder, this further resulting from actuation of the pull strap located in the vehicle. Alternatively, a push button extending from a top of the trunk mounted cylinder is capable of being independently depressed (without displacing the cable or its associated lever mount) and in order to (downwardly) displace the bracket into contact with the release lever in order to act upon and rotate the lever, in turn triggering cam and rotating pawl components of the latch out of engagement with a rear seat supported striker.

DESCRIPTION OF THE RELEVANT ART

The prior art is documented with triggering mechanisms such as located in a trunk compartment for releasing a rear interior row seatback to forwardly rotate to a dump position. An example of this is disclosed in U.S. Pat. No. 6,026,705 to Ficyk et al and which discloses a cable assembly secured inside a trunk compartment of a motor vehicle having dual actuating cables. The cable assembly includes a housing, a pulley member rotatably mounted to the housing and a slide lock member. A first actuator cable slidingly cooperates through the housing and pulley member with one end attached to a pull-strap inside the trunk compartment and the second end attached to a release latch.

A second actuator cable includes one end attached to a pull-strap located in proximity to the driver's seat and a second end attached to the pulley member to rotate the pulley member upon pulling the strap. Rotating of the pulley member engages it to a ball slug on the first actuator cable to drive the second end and actuate the release latch. A slide lock member is capable of engaging the pulley member to prevent rotation, and to prevent the pull strap in the passenger compartment from actuating the release latch.

Another example of a device for collapsing a back seat backrest is disclosed in Tsuge, U.S. Pat. No. 5,662,369 and in which the device is placed in communication with the rear trunk of the vehicle. The backrest is biased from an upright position to a collapsed position forwardly by a coiled biasing spring. A latch rod fixed to the backrest is received and held by a releasable latch of a backrest lock so that the backrest is releasably held in an upright position against the biasing force of the biasing spring.

The lock is connected to a control cable operable manually from the vicinity of the front seat of the car or from the vicinity of the trunk to render the latch holding action ineffective and release the latch rod. The biasing spring will then collapse the backrest forwardly. The backrest is restored manually to an upright position and locked in readiness for collapsing by the biasing spring. The control cable further exhibits a flexible outer casing and an inner cable slidable longitudinally therein.

SUMMARY OF THE PRESENT INVENTION

The present invention discloses a latch triggering mechanism for actuating a rear interior row seatback dump including a first generally cylinder shaped module mounted within a trunk of a vehicle, the module including a downwardly extending and displaceable bracket. A latch assembly is secured to a package surface separating the trunk from a passenger interior of the vehicle, a release lever associated with the latch extending in abutting contact with the bracket such that, upon actuating the bracket into contact with the lever, the latch disengaging a striker associated with a foldable seatback.

Additional features include a lever mounted to the module for displacing the bracket, a cable extending from the lever and terminating in a pull strap mounted within the passenger interior. A push button is mounted atop the module and actuates the bracket independently of the cable and lever. The lever is pivotally mounted at one perimeter edge location of the cylinder module and extends through a slotted interior established in both an outer housing and inner displaceable sleeve component. An opposite end of the lever is engaged by a first translatable end of the cable supported within a fixed outer flexible sleeve, such that downward displacement of the lever causes a bottom configured protrusion located within the cylinder module interior to abut a bottom of the displaceable sleeve and to displace the same downwardly.

The side configured slots formed in the outer housing and inner displaceable sleeve overlap and determine a range of pivotal motion of the lever and, consequently, a total linear range of downward displacement of the bottom extending bracket. The bracket further includes a bottom of the inner displaceable sleeve within the cylinder module engaging and downwardly actuating a post of the bracket. The post is biased by an inner supported coil spring in an upward direction away from the release lever and against a biasing downward force exerted by at least one of a push button mounted atop the module or the cable actuated lever.

An upper flange is incorporated into the outer housing of the cylinder module and facilitates mounting within a location associated with the vehicle trunk. The latch assembly further includes a first support bracket and a second spaced apart support bracket, a flange is further mounted against an inward face of a selected one of the brackets, with a striker engaging pawl and aligning cam rotatably supported between the flange and release lever in sandwiched fashion between the support brackets.

The release lever further includes a tabbed edge extending at an angled location associated with the release lever, such that pivoting of the lever in a counter clockwise direction causes an opposite end configured portion of the lever to rotate the cam against its spring bias and in a disengaging direction thereby unseating the pawl and causing the same to reverse rotate in direction against its corresponding spring bias to unseat from a striker extending from a rear surface of a seatback. The latch assembly is mounted to the package shelf such that the rotating pawl projects forwardly into the vehicle interior space, the release lever extending rearwardly through an aperture into the trunk compartment and so that the tabbed edge terminates at an incrementally spaced location below the vertically displaceable bracket of the cylinder module.

BRIEF DESCRIPTION OF THE DRAWINGS

Reference will now be made to the attached drawings, when read in combination with the following detailed description, wherein like reference numerals refer to like parts throughout the several views, and in which:

FIGS. 6A and 6B are a pair of illustrations depicting the independent and alternate functioning button and cable & lever actuating functions for downwardly actuating the cylinder supported bracket;

DETAILED DESCRIPTION OF THE PREFERRED EMBODIMENTS

The present invention discloses a trunk latch triggering mechanism for actuating a rear interior row seatback dump. As will be described in further detail below and with reference successively to each of FIGS. 1-13, the mechanism includes a first cylinder module mounted within a trunk of the vehicle and which communicates, via a cable, with a pull strap located at a seat side location within the vehicle interior.

A rear seatback release latch is mounted to an inward facing package shelf location within the vehicle and includes a release lever extending through a proximate located aperture defined in the package shelf and into proximity with a downwardly displaceable bracket associated with the trunk mounted cylinder. Actuation of the latch triggered in one instance by displacement of the cable pivotally mounted to a bottom spring biased and displacing bracket incorporated into the cylinder, this further resulting from actuation of the pull strap located in the vehicle. Alternatively, a push button extending from a top of the trunk mounted cylinder is capable of being independently depressed (without displacing the cable or its associated lever mount) and in order again to downwardly displace the bracket in order to act upon and rotate the release lever extending through the aperture and into the trunk interior, this in turn triggering cam and rotating pawl components of the latch out of engagement with a rear seat supported striker.

Figure 1A:
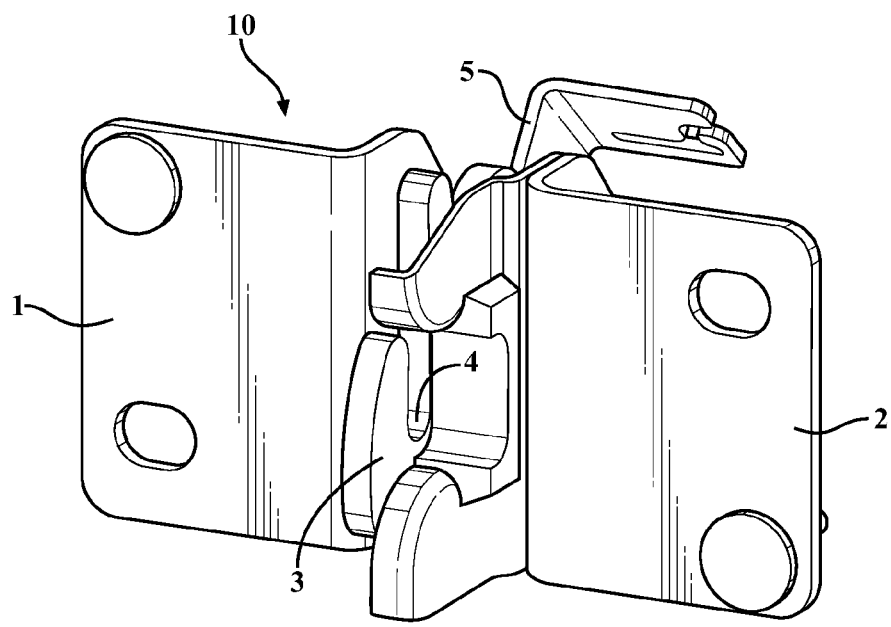
FIGS. 1A-1D are a series of rotated perspective illustrations of a pair of rear row seatback release latch assemblies including a first latch (FIGS. 1A and 1B) and a second redesigned latch (FIGS. 1C and 1D)
Figure 1B:
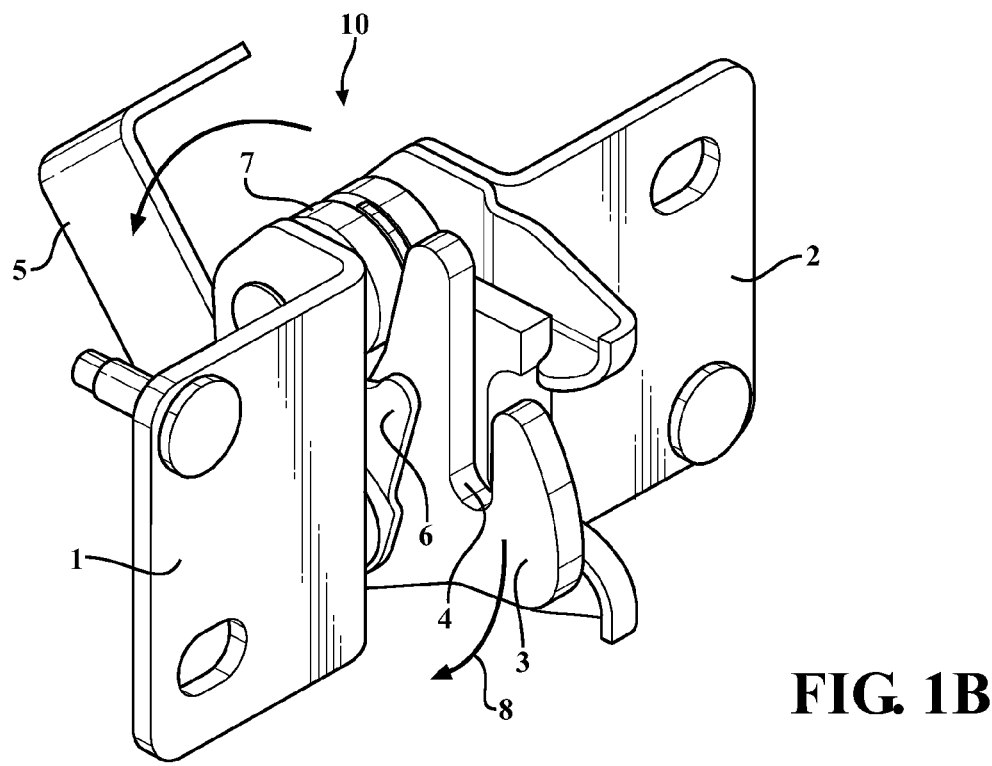
Figure 1C:
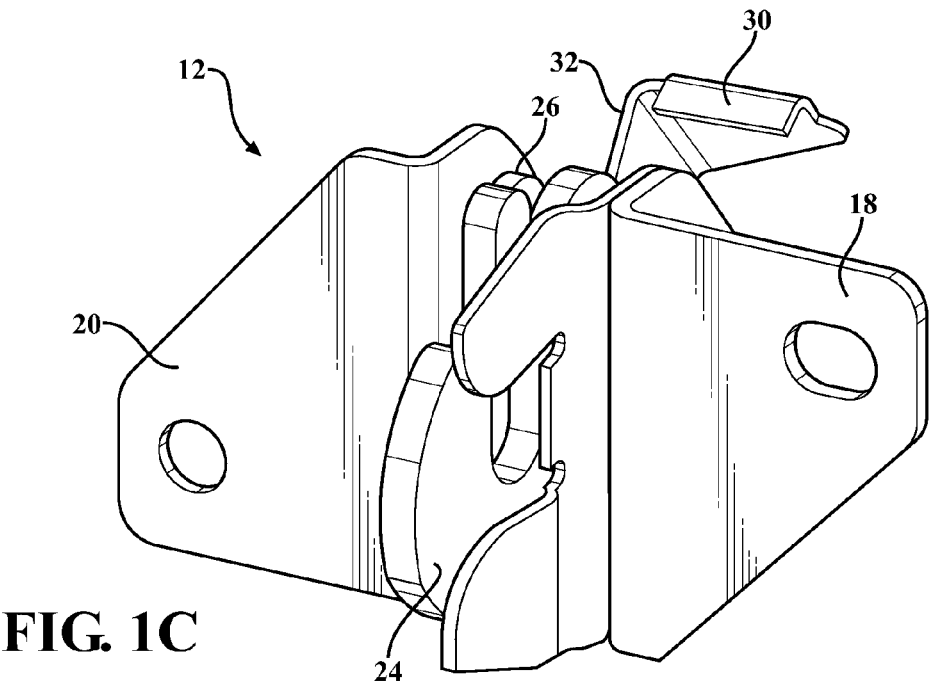
Figure 1D:
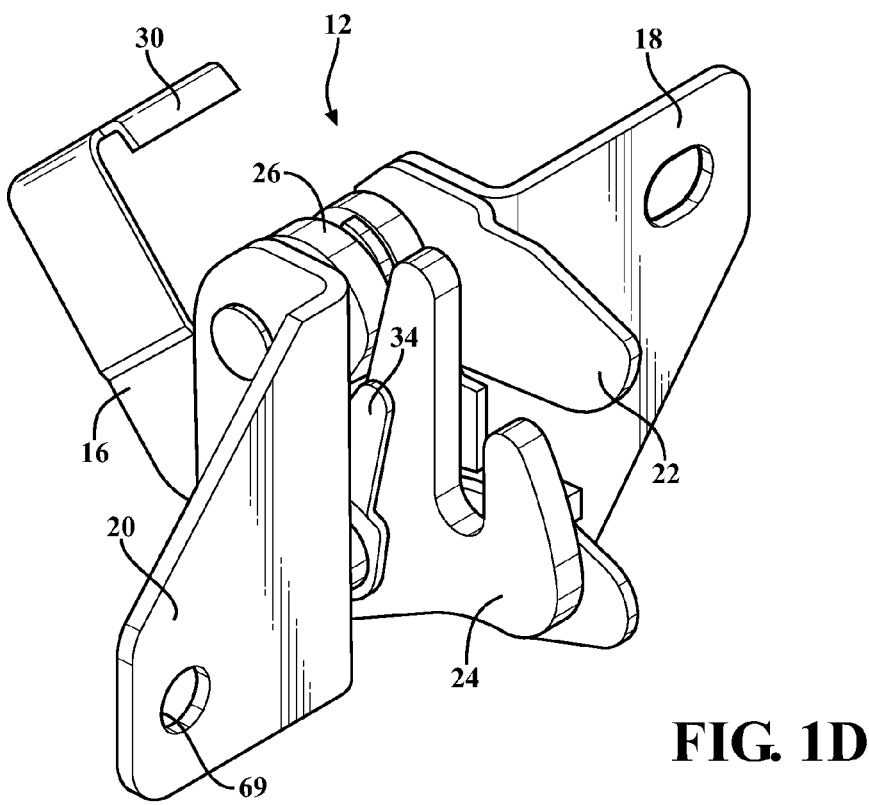

Referring to the illustrations, and initially to FIGS. 1A-1D, a series of illustrations are depicted of a pair of rear row seatback release latch assemblies including a first latch configuration, see at 10 in FIGS. 1A and 1B and a second redesigned latch, further shown at 12 in FIGS. 1C and 1D. The latch 10 includes support brackets 1 and 2, between which is situated a rotating pawl 3 with a hook recessed engaging profile 4. A release lever 5 includes an end configured portion 6 (FIG. 1B) which, upon the lever 5 being actuated in a pivoting direction by a strap or the like (see at 9 in FIG. 2A) to kick out (rotate) an associated cam 7 against its spring bias and in a disengaging direction thereby unseating the pawl 3 and causing the same to reverse rotate in a direction 8 against its corresponding spring bias to unseat from a striker (not shown) extending from a rear surface of a seatback. The present invention, while contemplating reconfigurations to an interior facing and package shelf mounted latch, notably includes the provision of the trunk situated release actuating cylinder as depicted in FIG. 5 et seq.

Figure 2A:
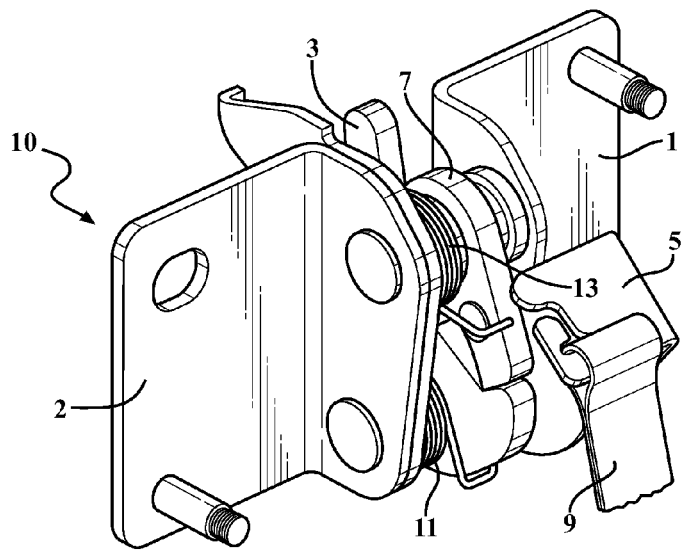
FIGS. 2A and 2B illustrate further rotated perspective views of the latches depicted in FIGS. 1A and 1C, respectively, with FIG. 2B further depicting the pivotally mounted release bracket actuated by the cylinder bracket for triggering a cam incorporated into the latch.
Figure 2B:
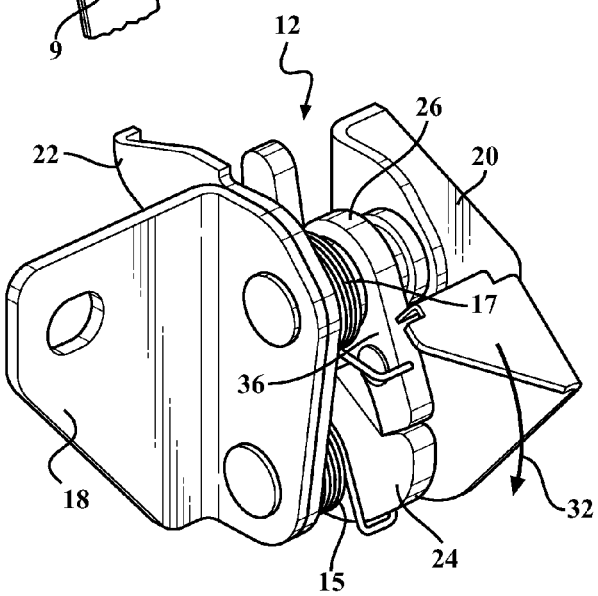

FIGS. 2A and 2B illustrate further rotated perspective views of the latches 10 and 12 depicted in FIGS. 1A-1B and 1C-1D, respectively. In the case of FIG. 2A, a pair of coil springs 11 and 13 are further depicted for respectively biasing the lever 5 and cam 7. Corresponding springs are further shown at 15 and 17 in FIG. 2B in respect to biasing a pawl 24 and cam 26.

Figure 3:
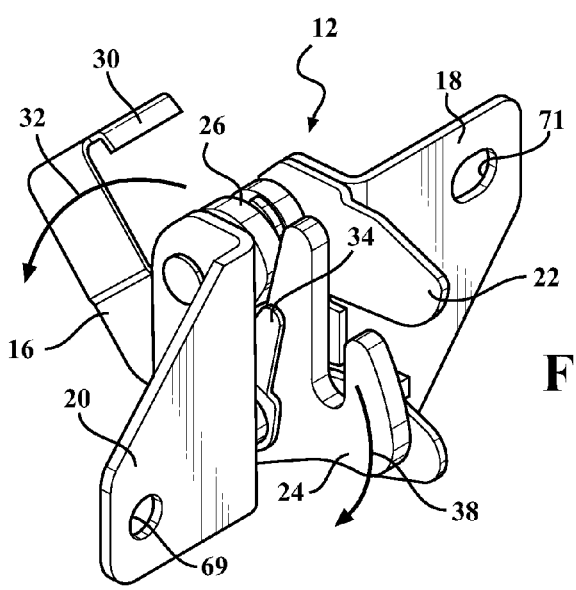
FIG. 3 is an enlarged perspective illustrating the latch design of FIG. 1C and depicting several redesign features complementing the configuration and positioning of the trunk mounted cylinder.
Figure 4A:
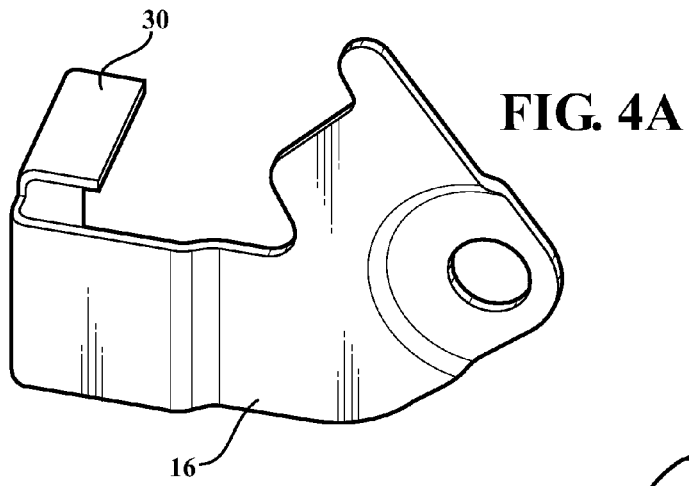
FIGS. 4A and 4B respectively illustrate the release lever and mounting bracket components associated with the latch design of FIG. 3.
Figure 4B:
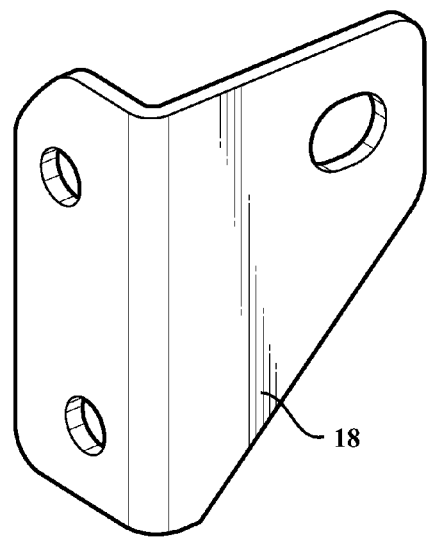
Figure 5:
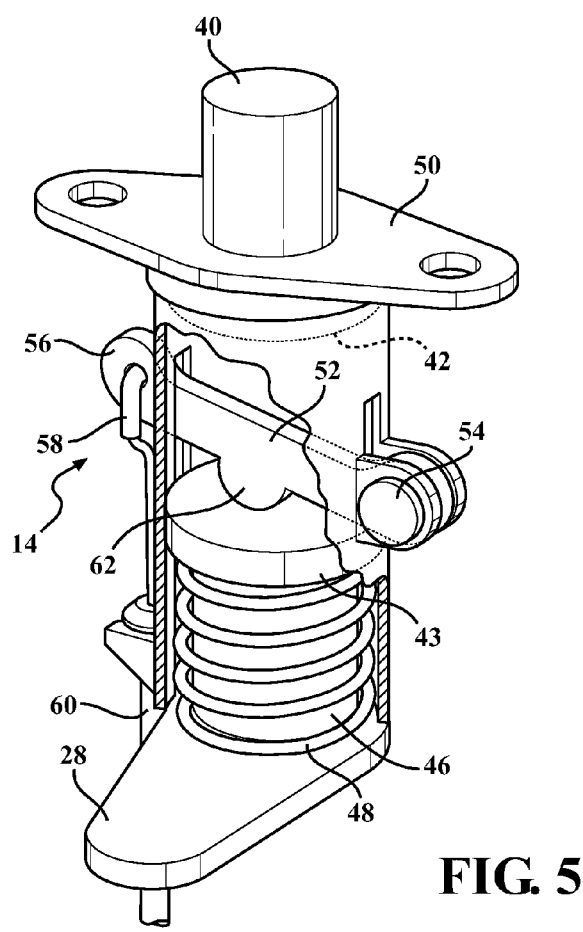
FIG. 5 is an illustration of a trunk mounted release cylinder exhibiting both push button and independent cable and lever actuating mechanisms for displacing a bottom bracket into contact with the latch release lever.

FIG. 2B again depicts the pivotally mounted release bracket actuated by the cylinder bracket for triggering a cam incorporated into the latch, whereas FIG. 3 is an enlarged perspective illustrating the latch design 12 and depicting several redesign features complementing the configuration and positioning of the trunk mounted cylinder (see as generally depicted at 14 in FIG. 5 et seq.). Among these are an angularly configured release lever 16 (see also FIG. 4A) which is pivotally supported between a first support bracket 18 (also FIG. 4B), and a second spaced apart support bracket 20. Other latch components include a flange 22 mounted against an inward face of bracket 18, the striker engaging pawl 24 and aligning cam 26 previously recited and which are rotatably supported between the flange 22 and release lever 16.

Figure 8:
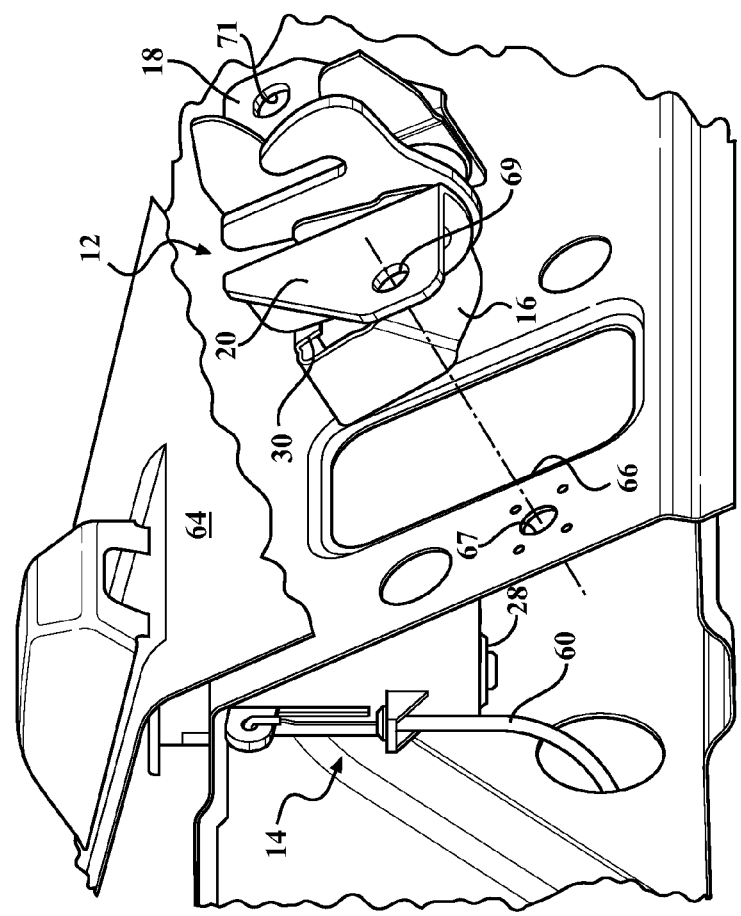
FIG. 8 is an environmental and exploded illustration of a package shelf separating the vehicle trunk and interior and further depicting the aperture location through which the trunk mounted cylinder bracket actuates the inner mounted latch release lever.
Figure 7:
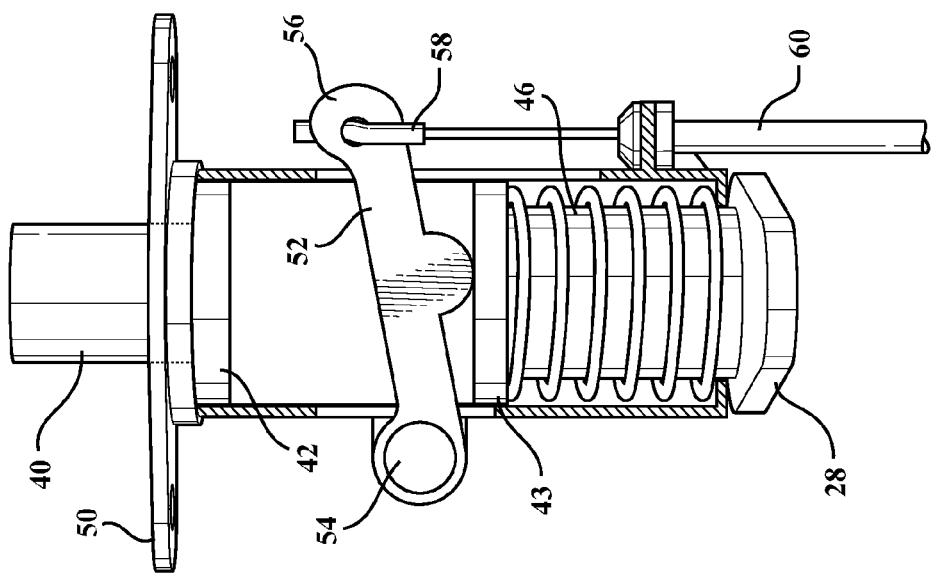
FIG. 7 is a further depiction of the cylinder similar to FIGS. 6A and 6B and depicting the bottom supported bracket in a design/retracted and pre-actuated position.

As will be described in reference to FIG. 8 et seq., an engaging component is associated with the corresponding trunk mounted cylinder 14 (see bottom displaceable bracket 28 also depicted in FIGS. 5-7). The bracket 28 is positioned to engage a tabbed edge extending and angled location 30 associated with the release lever 16 (not readily evident from the separated nature of the latch 12 as depicted in FIG. 8 for purposes of clarity of representation however which is depicted with reference to subsequent views FIGS. 9, 10A, 10B, and 11), such that pivoting of the lever 30 in a counter clockwise direction (see at 32 in FIG. 3) causes an opposite end configured portion 34 of the lever 16 (see again FIG. 3) to kick out (rotate) the cam 26 against its spring bias and in a disengaging direction (arrow 36 in FIG. 2B) thereby unseating the pawl 24 and causing the same to reverse rotate in direction 38 against its corresponding spring bias (FIG. 3) to unseat from a striker (not shown) extending from a rear surface of a seatback Referring again to FIG. 5, the trunk mounted release cylinder 14 is again illustrated and exhibits a top end situated push button 40 which downwardly actuates an inner sleeve component with spaced apart top 42 and bottom 43 end surfaces. The bottom 43 of the sleeve engages and downwardly actuates a post 46 of the bracket 28, the post 46 in turn being biased by an inner supported coil spring 48 in an upward direction against a biasing downward force exerted by the button 40. An upper flange 50 is incorporated into the outer housing of the cylinder 14 and facilitates mounting within a location associated with the vehicle trunk as depicted in FIG. 8.

Referring again to FIGS. 5-7, an independent operable cable and lever actuating mechanism is also provided for displacing the bottom bracket 28 into contact with the latch release lever 16 of the latch 12 (it being understood that the push button 40 and cable and lever options being independently operable for actuating the latch). A lever 52 is pivotally mounted at one perimeter edge location 54 of the cylinder 14 and extending through a slotted interior of the cylinder established in both the outer housing and inner displaceable sleeve component (see as best shown in FIG. 5).

An opposite end 56 of the lever 52 is engaged by a first translatable end 58 of a cable supported within a fixed outer flexible sleeve 60. Downward displacement of the lever 52 causes a bottom configured protrusion 62 (see in cutaway in FIG. 5) located within the cylinder interior to abut the bottom 43 of the displaceable sleeve and to displace the same downwardly in the same fashion as the depressing of the push button 40. The side configured slots (again FIG. 5) determine a range of pivotal motion of the lever 52 and, consequently, a total linear range of downward displacement of the bracket 28.

Referring to FIGS. 6A and 6B, a pair of illustrations are shown which depict the independent and alternate functioning button and cable & lever actuating functions for downwardly actuating the cylinder supported bracket 28. FIG. 7 is a further depiction of the cylinder similar to FIGS. 6A and 6B and depicting the bottom supported bracket 28 in a design/retracted and pre-actuated position.

Referring to FIG. 8, an environmental illustration is again provided of a package shelf 64 separating the vehicle trunk and passenger interior and further depicting an aperture location (see inwardly facing perimeter rim 66) through which extends the inner mounted latch release lever 16 (again shown in outwardly spaced and arrayed position relative to the rim 66) such that, upon being mounted in place as subsequently depicted in FIG. 9, the tabbed edge 30 is located in proximity to an underside of the cylinder bracket 28. The latch assembly 12, while again depicted in partially exploded fashion in FIG. 8, is clearly understood as mounting to support locations associated with the package shelf 64 (see selected mounting location 67 in FIG. 8 which aligns with aligning and selected mounting aperture 69 in bracket 20 (a further mounting aperture evident at 71 in associated with bracket 18) as well as is depicted in subsequent mounted fashion in the side view illustration of FIG. 9) such that it is generally centered over the aperture and the release lever 28 and so that the lever 16 is allowed to project into the adjoining trunk interior.

Likewise, the cable 60 is passed through holes in the front and rear of the package shelf and terminates in an opposite end in a pull strap 68 (see FIGS. 12-13) which is secured to a seat side location within the vehicle interior. In this fashion, the rear seatback (not shown) is capable of being actuated to a forwardly rotated/dump position through either depressing of the trunk cylinder push button 40 or pulling of the interior strap 68, in either instance causing the downward displacement of the inner cylinder sleeve and the bracket 28 in slaved cooperating fashion.

Figure 9:
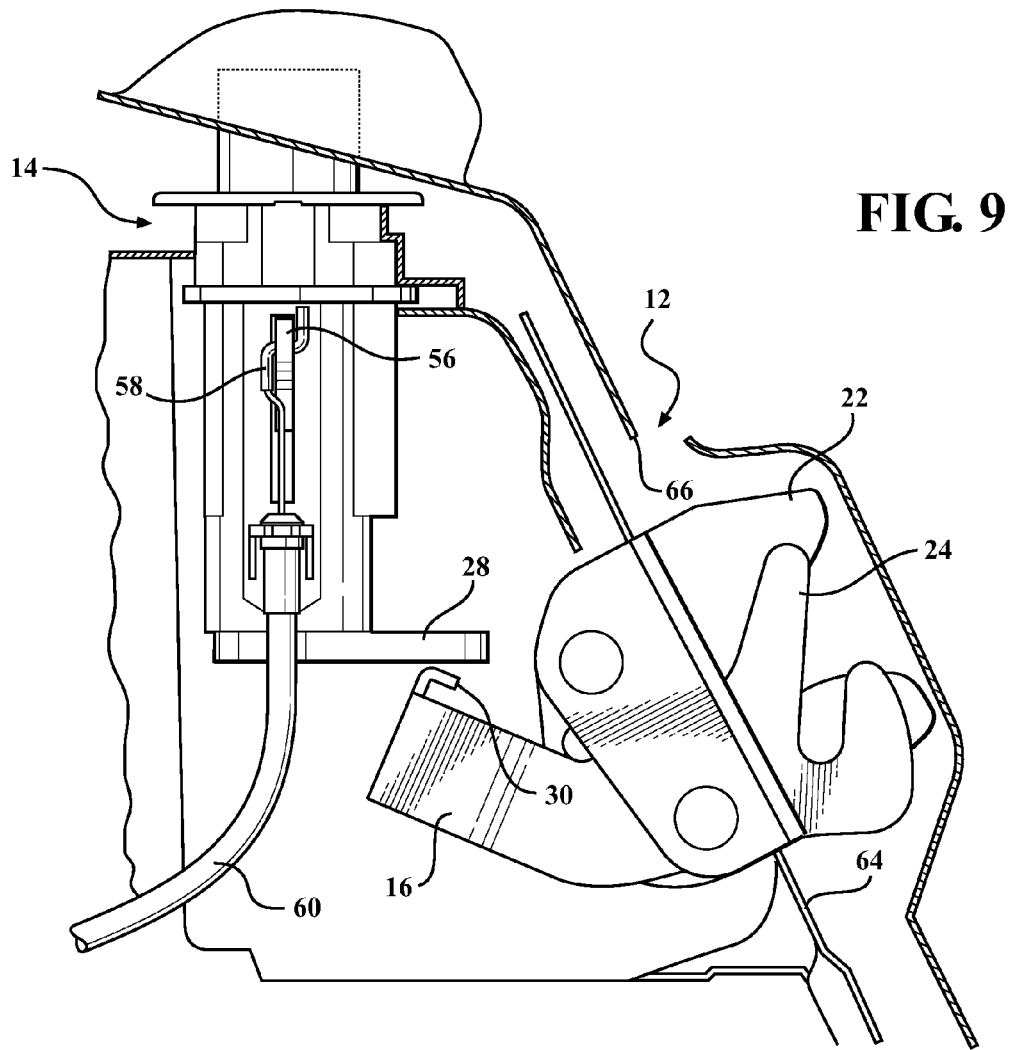
FIG. 9 is a rotated plan cutaway of the environmental view of FIG. 8 and depicting the mounting arrangement of the trunk cylinder and inner passenger space facing and package surface mounted latch.

Proceeding to FIG. 9, a rotated plan cutaway of the environmental view of FIG. 8 is shown and depicts from another perspective the mounting arrangement of the actuation cylinder 14 within the trunk compartment in proximity to the aperture associated with the rear package shelf and inner passenger space facing and package surface mounted latch 16. As further again shown, the mounting arrangement of the latch assembly 12 to the package shelf 64 is such that the rotating pawl projects forwardly into the vehicle interior space (at which it engages in its design position a rear extending striker bar associated with a folding rear seatback). The pivotally actuating release lever 16 extends rearwardly into the trunk compartment and so that its upper curled tab edge 30 terminates at an incrementally spaced location below the vertically displaceable bracket 28 associated with the trunk cylinder 14 which is further located slightly above and rearwardly of the latch assembly 12.

Figure 10B:
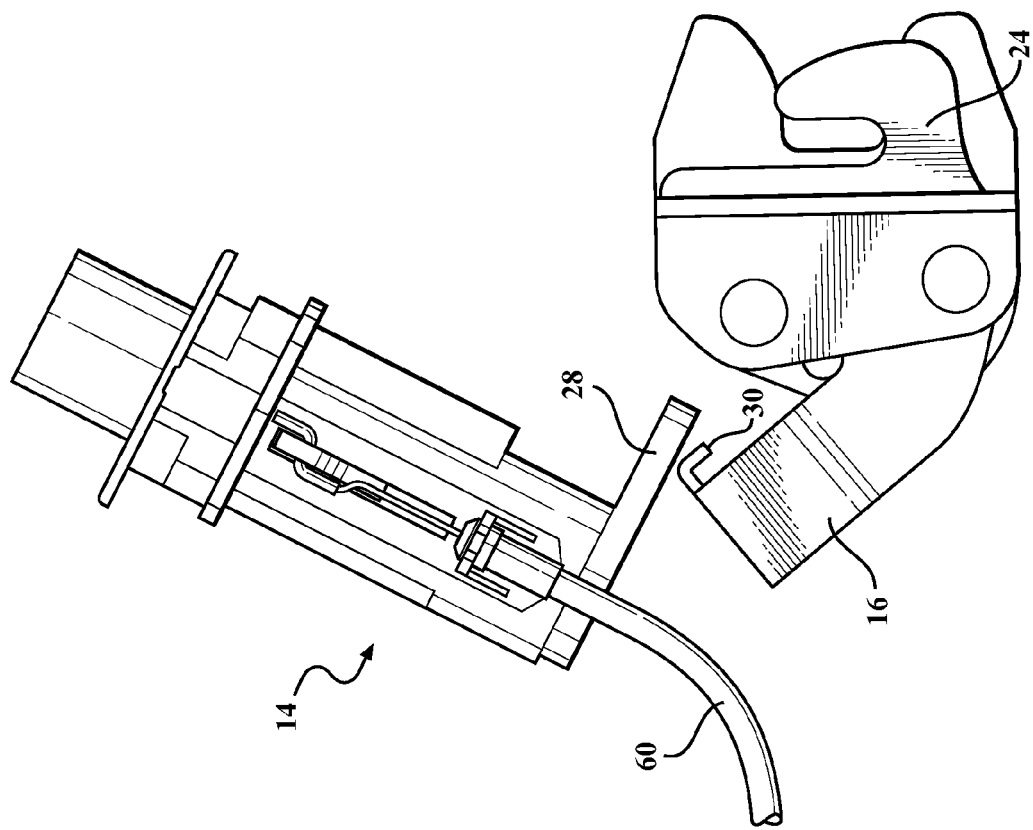
FIGS. 10A and 10B illustrate further perspective and rotated plan views isolating the trunk mounted cylinder and inner package shelf mounted release latch.
Figure 10A:
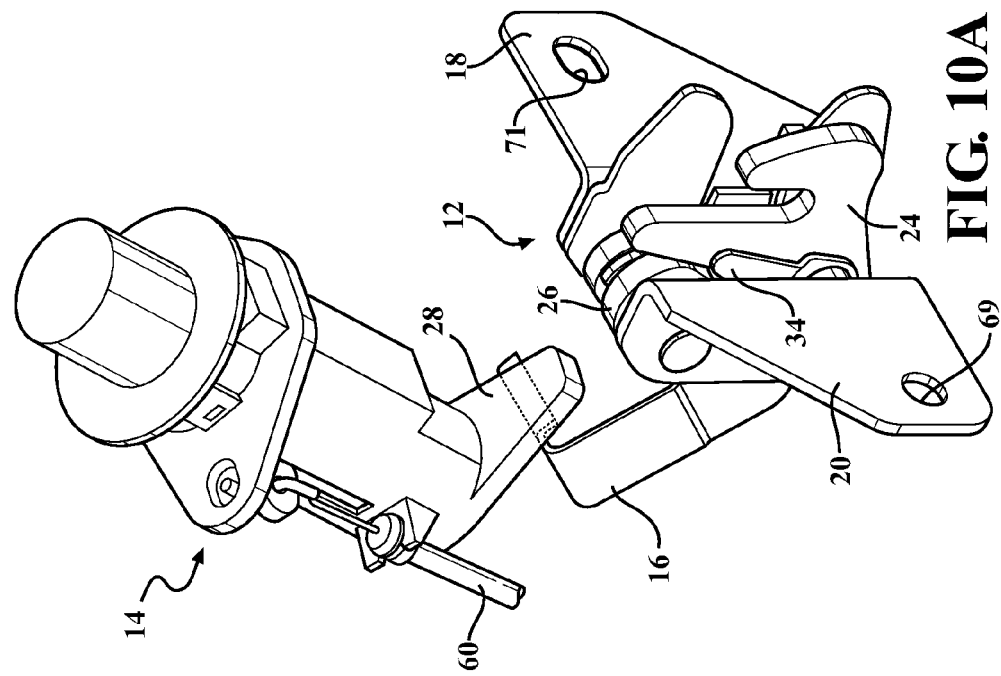
Figure 11:
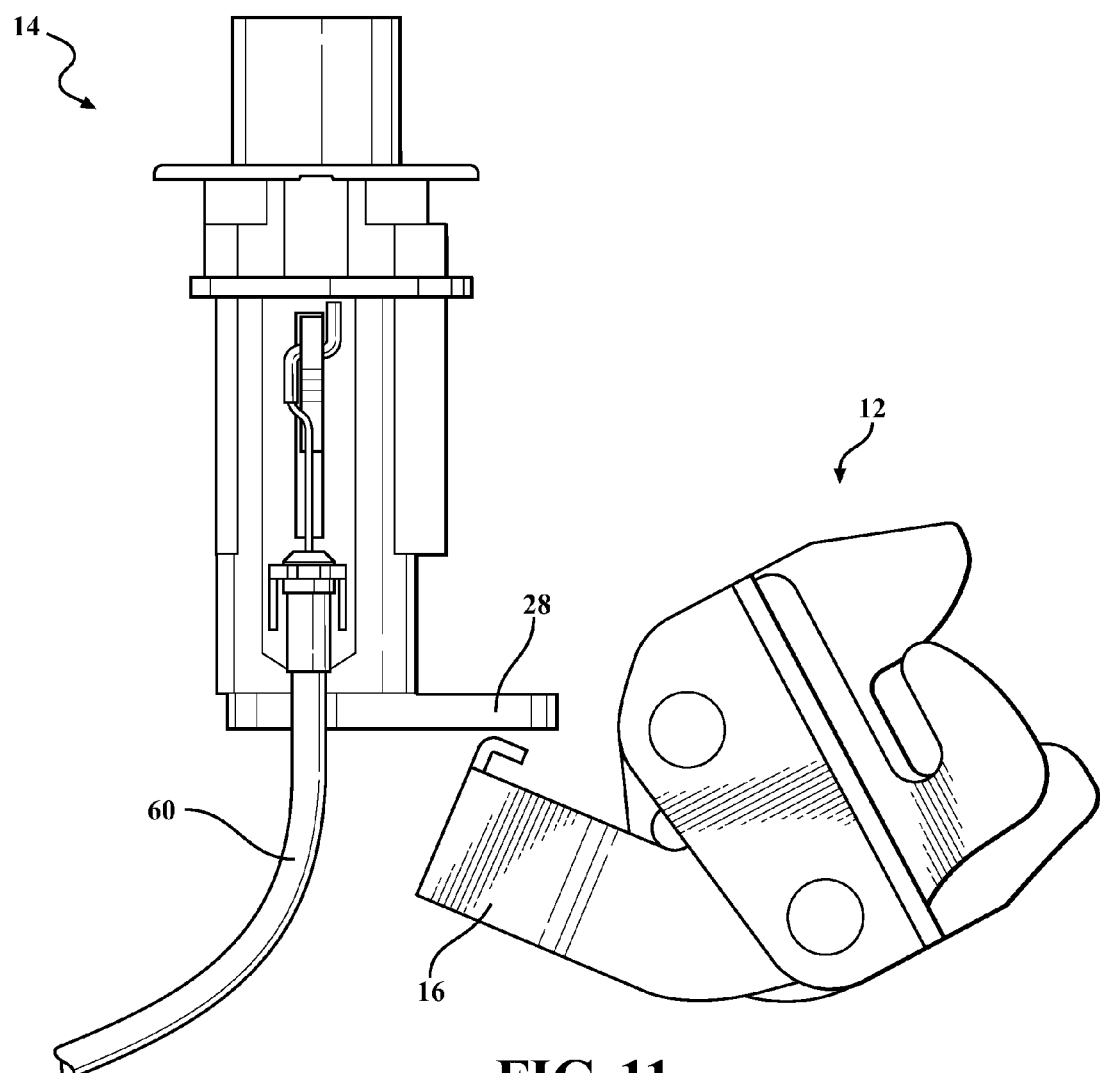
FIG. 11 is a plan view similar to FIG. 10B and better showing the contact point established between the key cylinder portion of the downwardly extending bracket and the latch supported and pivotal release lever.

FIGS. 10A and 10B illustrate further perspective and rotated plan views isolating the trunk mounted cylinder 14 and inner package shelf mounted release latch 16 and again depicting the clearance established between the bracket 28 and tabbed edge 30 of the release lever 16 prior to downward triggering actuation of the lever (and resultant rotation of the cam and pawl components as previously described in FIG. 3). FIG. 11 is a plan view similar to FIG. 10B and better showing the key cylinder to release lever contact point established between the key cylinder portion of the downwardly extending bracket and the latch supported and pivotal release lever.

Figure 12A:
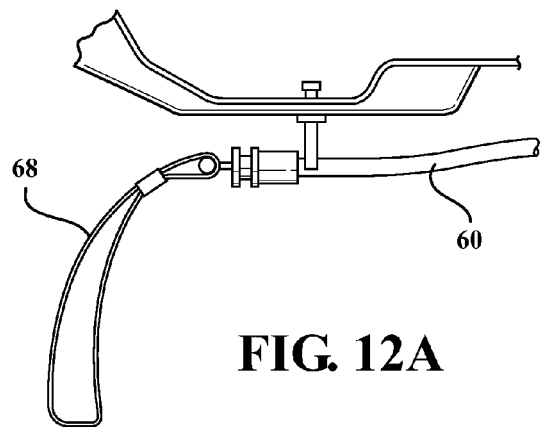
FIGS. 12A-12C illustrates the protocol for triggering the cable and lever actuating functions via a vehicle interior located pull strap.
Figure 12B:
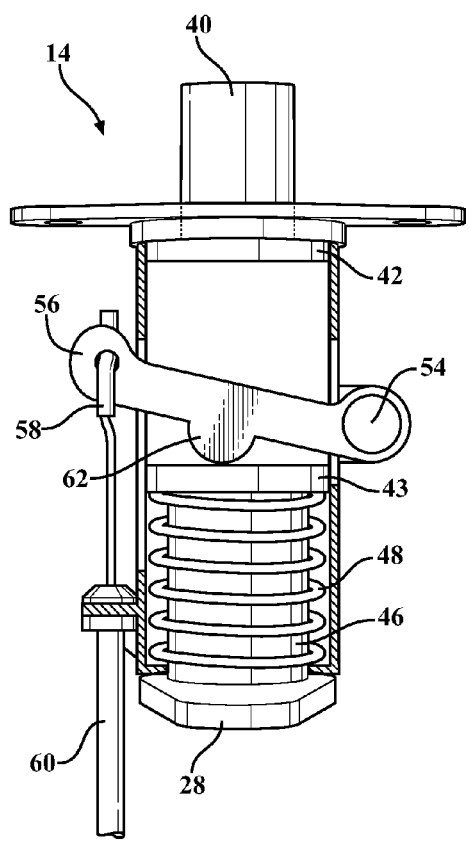
Figure 12C:
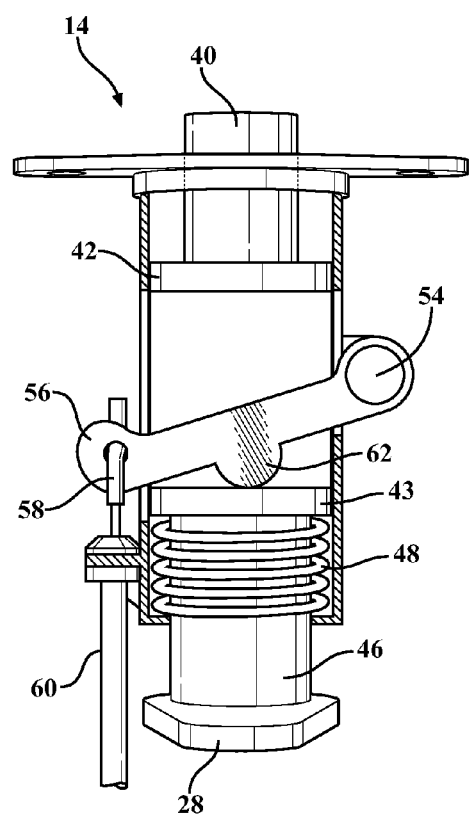

FIGS. 12A-12C illustrates the protocol for triggering the cable and lever actuating functions via a vehicle interior located pull strap (such as previously described) and which again includes strap 68 being actuated to displace cable 60, in turn actuating pivot lever 52 in order to displace the bracket 28 in the manner previously described.

Figure 13B:
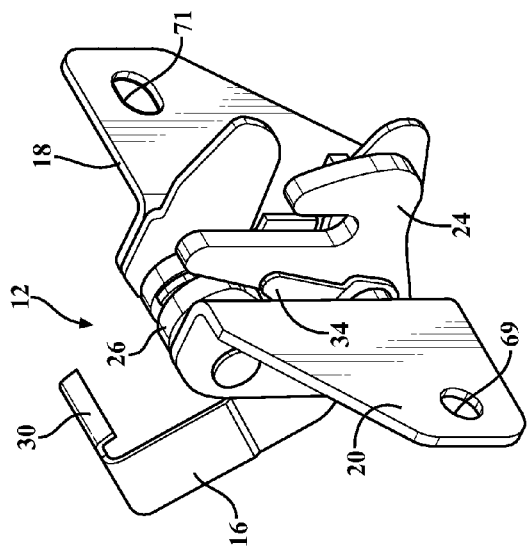
FIGS. 13A & 13B and 13C & 13D respectively illustrate 60% and 40%, respectively, cable and latch operating, positions.
Figure 13A:
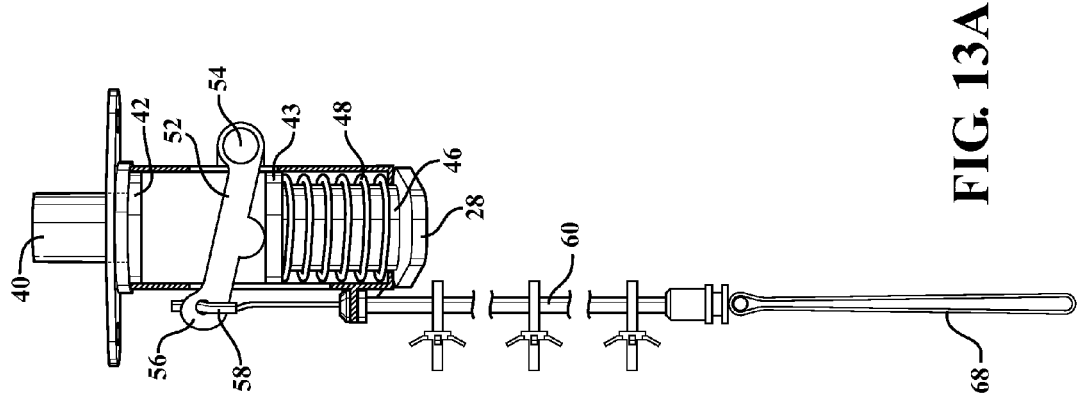
Figure 13C:
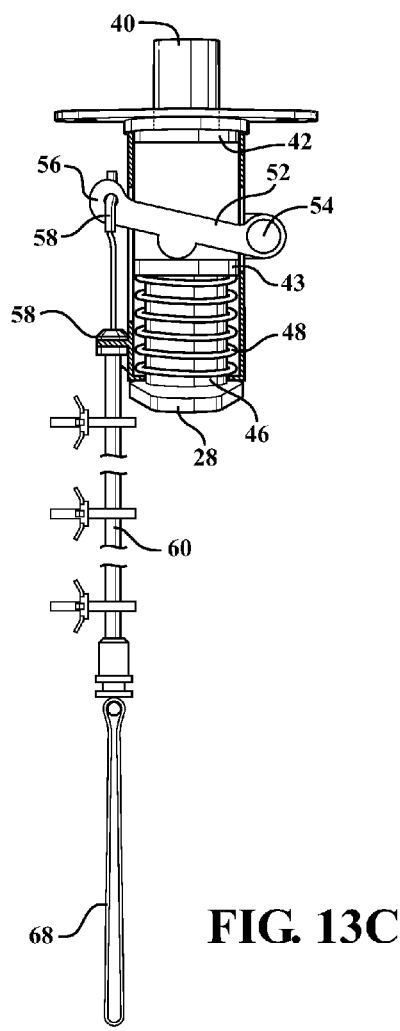
Figure 13D:
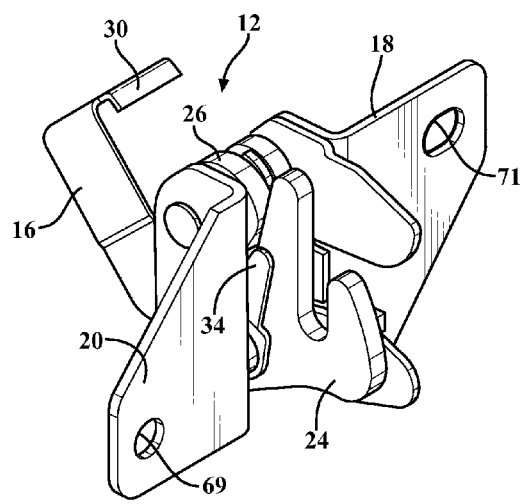

FIGS. 13A & 13B and succeeding FIGS. 13C & 13D respectively illustrate 60% and 40% seat interface assemblies and respectively, cable and latch operating, positions. The latches 12 are substantially identically depicted in FIGS. 13B and 13D with only minor variations in dimension and geometry (the 60% seat latch in FIG. 13B exhibiting incrementally greater dimensions than corresponding 40% seat latch in FIG. 13D).

Having described our invention, other and additional preferred embodiments will become apparent to those skilled in the art to which it pertains, and without deviating from the scope of the appended claims.

I claim:

1. A latch triggering mechanism for actuating a rear interior row seatback dump, comprising:
   a first generally cylinder shaped module affixed within a trunk of a vehicle, said module including a downwardly extending and displaceable bracket;

a latch assembly secured to a package surface separating the trunk from a passenger interior of the vehicle, a release lever associated with said latch extending into the trunk and in abutting contact with an underside of said bracket such that, upon actuating said bracket into contact with said lever, said release lever being pivoted in a first direction, triggering rotation of a cam in contact with said release lever;

a lever mounted to said cylinder shaped module at a perimeter edge location, said lever extending through an interior of said module and projecting, at an opposite perimeter edge location, through a longitudinally extending slot formed in a wall of said module, a bottom configured protrusion associated with an interior location of said lever and, upon said projecting end of said lever being caused to pivot downwardly along said slot, resulting in said bottom protrusion displacing said bracket, a cable including a fixed outer sleeve mounted to an exterior location of said module, an inner translatable portion extending from a first end of said outer sleeve and engaging said projecting end of said lever, an opposite and second extending end of said inner translatable portion of said cable engaging a pull strap mounted within the passenger interior; and said latch further including a pawl engaging a seat back mounted striker in a first position, said pawl being rotatably supported in contact with said cam and, upon triggered rotation of said cam, being caused to rotate in an opposite direction relative to said release lever in a second position to unseat from the striker and to release the seatback to rotate to a dump position.

2. The invention as described in claim 1, further comprising a push button mounted atop said cylinder shaped module and, upon being downwardly depressed, actuating said bracket independently of said cable and lever.

3. The invention as described in claim 2, said cylinder shaped module further comprising an inner displaceable sleeve component with spaced apart top and bottom surfaces, said bottom surface engaging and downwardly actuating a post associated with said bracket.

4. The invention as described in claim 3, further comprising said inner displaceable sleeve overlapping and determining a range of pivotal motion of said lever and, consequently, a total linear range of downward displacement of said bottom extending bracket.

5. The invention as described in claim 3, further comprising said post being biased by an inner supported coil spring in an upward direction away from said release lever and against a biasing downward force exerted by at least one of said push button mounted atop said module or said cable actuated lever.

6. The invention as described in claim 5, further comprising an upper flange incorporated into said outer housing of said cylinder module and facilitates mounting within a location associated with the vehicle trunk.

7. The invention as described in claim 1, said latch assembly further comprising a first support bracket and a second spaced apart support bracket, a flange mounted against an inward face of a selected one of said brackets, said pawl and aligning cam being rotatably supported between said flange and release lever in sandwiched fashion between said support brackets.

8. The invention as described in claim 1, further comprising said latch assembly being mounted to the package shelf such that said rotating pawl projects forwardly into the vehicle interior space, said release lever extending rearwardly through an aperture into the trunk compartment and so that a tabbed edge of the release lever terminates at an incrementally spaced location below said vertically displaceable bracket of said cylinder module.

9. A latch triggering mechanism for actuating a rear interior row seatback dump, comprising:

a first generally cylinder shaped module mounted within a trunk of a vehicle, said module including a downwardly extending and displaceable bracket;

a latch assembly secured to a package surface separating the trunk from a passenger interior of the vehicle, a release lever associated with said latch extending in abutting contact with said bracket such that, upon actuating said bracket into contact with said lever, said lever in turn triggering a pawl associated with said latch for disengaging from a striker associated with a foldable seatback;

a lever mounted to said module for displacing said bracket, a cable including a fixed outer sleeve mounted to an exterior location of said module, an inner translatable portion extending from a first end of said outer sleeve and engaging a projecting end of said lever, an opposite and second extending end of said inner translatable portion of said cable engaging a pull strap mounted within the passenger interior;

an inner displaceable sleeve component with spaced apart top and bottom surfaces incorporated into an interior of cylinder module, said bottom surface engaging and downwardly actuating a post associated with said bracket; and a push button mounted atop said module, said inner displaceable sleeve being in operative engagement with either of said push button or said cable operated lever and, in response to either depressing of said push button or pivoting of said lever by said cable, being displaced along a linear direction of said cylinder module for actuating said bracket to trigger disengagement of said pawl from said striker.

10. The invention as described in claim 9, further comprising said lever pivotally mounted to said cylinder shaped module at a perimeter edge location thereof, said lever extending through a slotted interior established in both an outer housing and said inner displaceable sleeve component, displacement of said lever causing a bottom configured protrusion of said lever located within said cylinder module interior to abut said bottom surface of said displaceable sleeve.

11. The invention as described in claim 10, further comprising a pair of side configured slots formed in said outer housing of said cylinder module between which said cable actuated lever extends and determining a range of pivotal motion of said lever and, consequently, a total linear range of downward displacement of said inner displaceable sleeve and connected bottom extending bracket.

12. The invention as described in claim 10, said post being biased by an inner supported coil spring in an upward direction away from said release lever and against a biasing downward force exerted by at least one of a push button or said cable actuated lever.

13. The invention as described in claim 12, further comprising an upper flange incorporated into said outer housing of said cylinder module and facilitates mounting within a location associated with the vehicle trunk.

14. The invention as described in claim 9, said latch assembly further comprising a first support bracket and a second spaced apart support bracket, a flange mounted against an inward face of a selected one of said brackets, a cam being in contact with said release lever and rotatably aligning with said striker engaging pawl between said flange and release lever in sandwiched fashion between said support brackets.

15. The invention as described in claim 14, said release lever further comprising a tabbed edge extending at an angled location associated with said release lever, such that pivoting of the lever in a counter clockwise direction causes an opposite end configured portion of said lever to rotate said cam against its spring bias and in a disengaging direction thereby unseating said pawl and causing the same to reverse rotate in direction against its corresponding spring bias to unseat from the striker extending from a rear surface of the seatback.

16. The invention as described in claim 15, further comprising said latch assembly being mounted to the package shelf such that that said rotating pawl projects forwardly into the vehicle interior space, said release lever extending rearwardly through an aperture into the trunk compartment and so that said tabbed edge terminates at an incrementally spaced location below said vertically displaceable bracket of said cylinder module.

17. A latch triggering mechanism for actuating a rear interior row seatback dump, comprising:
- a first generally cylinder shaped module mounted within a trunk of a vehicle, said module including a downwardly extending and displaceable bracket;
- a latch assembly secured to a package surface separating the trunk from a passenger interior of the vehicle, a release lever associated with said latch extending in abutting contact with said bracket such that, upon actuating said bracket into contact with said lever, said latch disengaging a striker associated with a foldable seatback;
- said latch assembly further comprising a first support bracket and a second spaced apart support bracket, a flange mounted against an inward face of a selected one of said brackets, a striker engaging pawl and aligning cam rotatably supported between said flange and release lever in sandwiched fashion between said support brackets;
- a lever mounted to said module for displacing said bracket, a cable extending from said lever and terminating in a pull strap mounted within the passenger interior;
- an inner displaceable sleeve component with spaced apart top and bottom surfaces incorporated into an interior of cylinder module, said bottom surface engaging and downwardly actuating a post associated with said bracket; and
- a push button mounted atop said module, said inner displaceable sleeve being in operative engagement with either of said push button or said cable operated lever and, in response to either depressing of said push button or pivoting of said lever by said cable, being displaced along a linear direction of said cylinder module for actuating said bracket to trigger disengagement of said pawl from said striker.

18. The invention as described in claim 17, further comprising said lever being pivotally mounted at one perimeter edge location of said cylinder module and extending through a slotted interior established in both an outer housing of said cylinder module and said inner displaceable sleeve, a projecting end of said lever engaged by a first translatable end of said cable supported within a fixed outer flexible sleeve such that downward displacement of said lever causes a bottom configured protrusion located within said cylinder module interior to abut a bottom of said displaceable sleeve and to displace the same downwardly.

19. A latch triggering mechanism for actuating a rear interior row seatback dump, comprising:
- a first generally cylinder shaped module affixed within a trunk of a vehicle, said module including a downwardly extending and displaceable bracket;
- a latch assembly secured to a package surface separating the trunk from a passenger interior of the vehicle, a release lever associated with said latch extending into the trunk and in abutting contact with an underside of said bracket such that, upon actuating said bracket into contact with said lever, said release lever being pivoted in a first direction, triggering rotation of a cam in contact with said release lever;
- said latch further including a pawl engaging a seat back mounted striker in a first position, said pawl being rotatably supported in contact with said cam and, upon triggered rotation of said cam, being caused to rotate in an opposite direction relative to said release lever in a second position to unseat from the striker and to release the seatback to rotate to a dump position; and
- said latch assembly further comprising a first support bracket and a second spaced apart support bracket, a flange mounted against an inward face of a selected one of said brackets, said pawl and aligning cam being rotatably supported between said flange and release lever in sandwiched fashion between said support brackets.

20. A latch triggering mechanism for actuating a rear interior row seatback dump, comprising:
- a first generally cylinder shaped module affixed within a trunk of a vehicle, said module including a downwardly extending and displaceable bracket;
- a latch assembly secured to a package surface separating the trunk from a passenger interior of the vehicle, a release lever associated with said latch extending into the trunk and in abutting contact with an underside of said bracket such that, upon actuating said bracket into contact with said lever, said release lever being pivoted in a first direction, triggering rotation of a cam in contact with said release lever;
- said latch further including a pawl engaging a seat back mounted striker in a first position, said pawl being rotatably supported in contact with said cam and, upon triggered rotation of said cam, being caused to rotate in an opposite direction relative to said release lever in a second position to unseat from the striker and to release the seatback to rotate to a dump position; and
- said latch assembly being mounted to the package shelf such that that said rotating pawl projects forwardly into the vehicle interior space, said release lever extending rearwardly through an aperture into the trunk compartment and so that a tabbed edge of the release lever terminates at an incrementally spaced location below said vertically displaceable bracket of said cylinder module.

* * * * *